United States Patent Office 2,885,382
Patented May 5, 1959

2,885,382

COMPOSITION COMPRISING A REACTION PRODUCT OF METHYLOL-AMINOTRIAZINE ALLYL ETHERS WITH AN α:β-UNSATURATED COMPOUND AND CAPABLE OF DRYING AT ROOM TEMPERATURE

Paul Zuppinger, Binningen, and Gustav Widmer, Basel, Switzerland, assignors to Ciba Limited, Basel, Switzerland, a Swiss firm No Drawing. Application July 16, 1956
Serial No. 597,846

Claims priority, application Switzerland July 27, 1955

10 Claims. (Cl. 260—45.2)

The manufacture of esterified methylol-melamine alkyl ethers is known: thus, inter alia, hexamethylol-melamine hexamethyl ether has been reacted with acrylic acid. When a metal drier and/or a peroxide is added to this product esterified with acrylic acid, such product exhibits no oxidative drying properties at room temperature or higher temperatures, so that coatings produced with this product do not dry at room temperature or higher temperatures, but remain sticky and soluble in organic solvents.

In application Ser. No. 322,552, filed November 25, 1952, by Gustav Widmer and Paul Zuppinger (now U.S. Patent No. 2,764,574, dated Sept. 25, 1956), there are described the manufacture and properties of methylol-aminotriazines etherified with allyl alcohol, which are obtained by methods in themselves known, for example, by reacting hexamethylol-melamine with allyl alcohol in the presence of an acid. Such methylol-melamine allyl ethers have the property of drying oxidatively at room temperature in the presence of metal driers, for example, cobalt naphthenate. The oxidative drying properties can be still further improved by the addition of a peroxide. However, at room temperature and even at a high temperature there are only produced masses which harden exclusively at the surface and not in the interior of the mass. The interior of such masses consists of a more or less unchanged thickly liquid to viscous product depending on the thickness of the layer.

For many purposes, for example, for the production of lacquer films, of thick coatings, of cast bodies, laminates, molding compositions, compositions capable of being spread by a spatula, and other products, it is desirable to obtain a product which is not only hard on the surface but is hard in its interior.

The present invention is based on the observation that, by reacting methylol-aminotriazine allyl ethers with α:β-unsaturated compounds, products are obtained which in the presence of metal driers and peroxides form masses which harden at the surface and also in the interior at a raised temperature and also at room temperature.

Accordingly, the present invention provides compositions which harden throughout at room temperature at the surface and in the interior and which contain a metal drier, a peroxide and a reaction product of a methylol-aminotriazine allyl ether containing at least two amino groups and at least two allyl groups with an α:β-unsaturated compound which contains only one group capable of reacting with the methylol-aminotriazine allyl ether.

As α:β-unsaturated compounds which contain only one group capable of reacting with methylol-aminotriazine allyl ethers there may be used compounds which contain, for example, a carboxyl, hydroxyl, acid chloride, acid amide, amino or isocyanate group. Accordingly, there may be used, for example, α:β-unsaturated monocarboxylic acids, such as acrylic acid, α-methacrylic acid, α-chloracrylic acid, α-styrylacrylic acid, α-isopropylidene-acrylic acid, crotonic acid, β-2-furylacrylic acid, cinnamic acid, α-phenyl-cinnamic acid, α- or β-bromocinnamic acid, α-methyl-cinnamic acid, α-ethyl-cinnamic acid, β-bromocrotonic acid, α-chlorocrotonic acid, sorbic acid, 1-cyclohexene-1-carboxylic acid, β-propyl-acrylic acid, monoesters of α:β-unsaturated dicarboxylic acids such as maleic acid, fumaric acid, mesaconic acid and citraconic acid, advantageously with unsaturated monohydric alcohols, such as allyl alcohol, for example maleic acid monoallyl ester, further polyesters obtained from α:β-unsaturated dicarboxylic acids, which polyesters contain per molecule 1 carboxylic group or 1 hydroxyl group, or polyester mixtures containing such polyesters. There may also be used mono-, di- or triesters of polyvalent, trivalent or tetravalent alcohols and α:β-unsaturated monocarboxylic acids, for example, glycol monoacrylic acid ester or glycerine diacrylic acid ester. There are also suitable, more especially acrylic acid amide, and also vinylamine, divinylamine and acrylic acid chloride.

The reaction of the methylol-aminotriazine allyl ether with the α:β-unsaturated compounds can be carried out in a simple manner by heating the mixture initially under slightly reduced pressure which is further reduced towards the end of the reaction until the greater part of the volatile constituents, especially water and allyl alcohol, and any excess of α:β-unsaturated compound, have been removed. In order to remove the last traces of volatile constituents the reaction mixture may be subjected to a high vacuum. The reaction is advantageously carried out in the presence of a polymerization stabilizer, for example, hydroquinone.

The proportion of the α:β-unsaturated compound used in the reaction depends on the properties desired in the end product. As a rule, products with high hardness are obtained in the case where masses contain 10–30 percent by weight of α:β-unsaturated compound, whereas products with softer properties are obtained from masses containing 30–60 percent by weight of α:β-unsaturated compound.

The products so obtained can be used with the addition of a metal drier and a peroxide to produce coatings, films, cast bodies, masses spreadable with a spatula or molding masses which harden at a raised temperature or even at room temperature. There are thus obtained hardened masses which also in thick layers are hard throughout and are dry at the surfaces.

The compositions are also used with advantage in admixture with a polymerizable monomeric and/or polymeric compound. There are advantageously used, for example, compounds which contain the group

and also α:β-unsaturated compounds or unsaturated polyesters. Such polymerizable monomeric compounds containing the group $CH_2=C<$ are for instance styrene, divinyl-benzene and substitution products thereof, and also vinyl compounds, such as vinyl esters, vinyl ethers, vinyl halides, etc., and also diallyl phthalate, triallyl-cyanurate, allyl-glycide, diallylamine or triallylamine. As polymerizable monomeric α:β-unsaturated compounds there can be used, for example, acrylic acid, methacrylic acid, etc. and esters thereof, for example, methacrylic acid butyl ester, and also acrylonitrile or diesters of unsaturated dicarboxylic acids, for example, diallylmaleate. As unsaturated polyesters there are mentioned the known reaction products of α:β-unsaturated dicarboxylic acids, such as maleic acid or fumaric acid, with polyalcohols, such as glycol, propylene glycol or butylene glycol, By the addition of polymerizable monomeric or polymeric compounds of the aforesaid kind to the compositions of the invention there are obtained masses which in the presence of a metal drier and a peroxide harden better at the surface and have a better chemical resistance. Such mixtures yield masses which harden rapidly throughout even at room temperature. Especially advantageous are mixtures of compositions of the invention with an unsaturated polyester dissolved in styrene, because in this way masses are obtained which harden not only at the interior but also at the surface. In contradistinction thereto there are obtained with polyester-styrene mixures which contain no addition of a composition of the invention, products which usually remain sticky and non-hardened at the surface.

The compositions of the invention can also be used with advantage for the manufacture of polyester-glass fiber laminates, for example, by applying the composition to the polyester laminate layer which has been exposed to the air and which advantageously has not completely reacted there is obtained a surface which is very resistant to solvent, hard and can, if desired, be polished. In this manner the otherwise lengthy and troublesome measures which have to be taken to prevent the access of air, which are usually necessary with polyester laminates, can be dispensed with.

As a metal drier there is preferably used a cobalt drier, for example, in the form of the naphthenate or the octoate, etc., and advantageously in a proportion of not more than 0.2 percent of cobalt. Suitable peroxides, are, for example, benzoyl peroxide, methyl ethyl ketone peroxide, hydroxycyclohexyl hydroperoxide (HCH) or ditertiary butyl peroxide, and the peroxide is used in a proportion of 1–10 percent, and advantageously 2–4 percent.

The following examples illustrate the invention, the parts and percentages being by weight. The methylolaminotriazine allyl ethers used in the examples as starting materials are prepared in the manner described in the aforesaid application Ser. No. 322,552, filed November 25, 1952, by Gustav Widmer and Paul Zuppinger (Patent No. 2,764,574), for product I, product IV and product V. In Examples 1 to 6 product I is used having a bromine number of 1625, an HO-number of 45 and a nitrogen content of 17.65 percent, which correspond to 4.83 mols of allyl groups and 0.34 mol of HO-groups per mol of melamine, respectively. The methylolmelamine allyl ether used in Example 7 corresponds to product IV having two allyl ether groups per mol of melamine and is used in the form of a solution of 41.3 percent strength in toluene. The methylol-benzoguanamine allyl ether used in Example 8 corresponds to product V.

For testing the products they were applied to a glass plate in a uniform manner by means of a doctor roll in such a manner that the mean film thickness was 50–100$\mu$. A further portion of each product to be tested was placed by itself in a test tube and the gelatinizing time and hardening period were observed.

Hardening was carried out at a room temperature of about 20° C. and at a relative humidity of about 65 percent. A.N. represents the acid number, S.N. represents the saponification number and E.N. represents the esterification number.

*Example 1*

3 portions each of 208 parts of methylol-melamine allyl ether were mixed with (a) 24 parts, (b) 72 parts, and (c) 240 parts of acrylic acid which had been stabilized with 0.05 percent of hydroquinone, and the mixture was heated in a water bath at 90° C. while stirring well. When the internal temperature had reached 70° C., the mixtures were subjected to a mild vacuum by means of a water jet pump for 4 hours, and during the reaction the pressure was further reduced so that the volatile constituents, such as water, allyl alcohol, etc., distilled off very slowly and only dropwise and the last traces of volatile constituents were removed only after subjecting the mixtures to a high vacuum. At the end of the reaction the internal temperature had reached 82° C. The last traces of volatile constituents were removed under a pressure of about 0.5 mm. of mercury for a period of ½ hour.

In the case of (a) there were obtained 203 parts of a reaction product having an acrylic acid content of 1.94 percent corresponding to 0.12 mol of acrylic acid per mol of melamine. In the case of (b) the yield amounts to 203.2 parts and the acrylic acid content was 10.8 percent corresponding to 0.72 mol of acrylic acid per mol of melamine. In the case of (c) a yield of 228 parts was obtained having an acrylic acid content of 33.4 percent corresponding to 2.45 mols of acrylic acid per mol of melamine.

The reaction products prepared according to (a), (b) and (c) were each catalyzed with 0.1 percent of cobalt in the form of cobalt naphthenate and with 3 percent of benzoyl peroxide, dissolved in dioctyl phthalate in the form of a paste of 60 percent strength, and the paste was applied to glass plates. The coatings were dust dry after 5 hours, 2 hours 25 minutes and 2 hours 20 minutes, respectively, and after one day at room temperature they had a Sward hardness of 17.2, 35.7 and 36.2, respectively, after 2 days of 21.8, 41.7 and 40, respectively, and after 3 days of 23.6, 45.6 and 40, respectively.

The gelatinizing period for (a) was one hour 25 minutes, for (b) 10 minutes, and for (c) 17 minutes.

After being kept for 4 days in a test tube a test portion of the catalyzed product (a) had solidified to a hard gel and products (b) and (c) had hardened throughout. These results were obtained at layer thicknesses exceeding three centimetres.

When, instead of the products (a), (b) and (c) reacted with acrylic acid, the methylol-melamine allyl ether was used alone and catalyzed in an analogous manner, there were obtained coatings which after being kept for one day at room temperature had a Sward hardness of only 3.3, and after 2 days of 3.4 and after 3 days of 4.5. The period required for the coatings to become dust-dry was 4 hours 35 minutes and the gelatinizing period exceeded 8 days. After 4 days the mass was still unchanged in the interior, that is to say it was still thickly liquid.

When 50 parts of reaction product (b) were mixed with 50 parts of distilled styrene, catalyzed with 0.1 percent of cobalt and 2 percent of benzoyl peroxide, and the composition was applied to glass plates, a dust-dry lacquer coating was obtained after 2 hours 35 minutes which after being kept at room temperature for one day had a Sward hardness of 53.2, after 2 days of 57.3 and after 3 days of 59.8. The lacquer composition gelatinized after about 36 hours and was hardened throughout after 4 days.

Instead of the aforesaid quantity of styrene, there may be used, for example, 50 parts of methacrylic acid butyl ester. Analogous values for the time required to obtain dust-dry coatings and for Sward hardness were obtained.

33 parts of the reaction product (b) were mixed with 66 parts of a solution in styrene of about 65 percent strength of an unsaturated polyester resin, for example, one of the products known under the commercial names Polylite 8001, Marcon resin 9, Laminac 4116, Soredur H–10, Casting resin P3 or Bakelite BRSQ–147, and mixed with 50 parts of distilled styrene and catalyzed with 0.1 percent of cobalt and 3–4 percent of benzoyl chloride. The composition was applied to glass plates. After about 3½–4½ hours the coating was dust-dry and after one day the Sward hardness had an average value of 12–15, after 2 days 20–25 and after 5 days above 30, at a film thickness of about 50–70$\mu$. The compositions gelatinized after about 1½ days and in all cases there was obtained very good surface hardening and also deep drying and through-hardening in the interior of the mass, and an improved resistance to solvents, chemicals and water was obtained.

When 100 parts of any one of the above polyester resin solutions was mixed with 50 parts of distilled styrene and catalyzed in the manner described above, but without the addition of reaction product (b), dust-dry lacquer films were obtained after about 3½–4½ hours, but after being kept for one day at room temperature they were very sticky when touched by the finger and after 2 days had a Sward hardness of about 3–5 and after 5 days of about 10.

When, instead of benzoyl peroxide, there is used, for example, a mixture of hydroxycyclohexyl hydroperoxide and methyl ethyl ketone peroxide (1:1), mixtures are obtained that can be kept only for a short time. In this case, therefore, it is necessary to use the composition in two portions. In order to produce lacquer coatings there was placed in the upper spray container a mixture of reaction product (b) and the polyester resin solution, which had been mixed with a monomeric vinyl compound, advantageously styrene, to give a consistency suitable for spraying and cobalt drier was added. The peroxides were also diluted with the vinyl compound and mixed with the first-mentioned lacquer solution by the injector action of the air stream of the spraying gun. In this manner there are obtained lacquer coatings which even when applied in the thickest layers are dust-dry in about one hour and are dry to the fingernail after a further 5 hours, depending on the quantity of catalyst added.

123 parts of a polyester resin solution of 65 percent strength in styrene, known in commerce as Marcon resin 9, were triturated with 240 parts of titanium dioxide and 40 parts of distilled styrene for 5 days in a porcelain ball mill. With the resulting pigment mixture the following lacquer mixtures were prepared:

|  | No. 1 | No. 2 |
| --- | --- | --- |
|  | Parts | Parts |
| Pigment mixture | 36.1 | 42.1 |
| Polyester resin solution of 65 percent strength in styrene | 88.9 | 53.1 |
| Reaction product (b) |  | 33 |
| Cobalt solution in the form of the naphthenate, solution of 5 percent strength weight/volume in butanone | 1.448 | 1.692 |
| Benzoyl peroxide, paste of 60 percent strength in dioctyl phthalate | 4.83 | 5.64 |

When these lacquer solutions were cast on to glass plates it was clearly seen that lacquer No. 1 was still wet and very sticky after standing for 18 hours, whereas lacquer No. 2 was dust-dry even after 6 hours and after 18 hours it could no longer be scratched by the fingernails.

This clearly shows the influence of reaction product (b) on the drying capacity of a so-called solvent-free polyester resin pigmented with titanium dioxide, which resin itself, as is for example also indicated in the working procedure for the polyester resin Marcon resin 9, need not be pigmented with titanium dioxide.

Example 2

208 parts of methylol-melamine allyl ether were reacted with 91.3 parts of α-methacrylic acid stabilized with 0.05 percent of hydroquinone, in a manner analogous to that described in Example 1. There were obtained 199 parts of a final product having a methacrylic acid content of 6.7 percent, corresponding to 0.36 mol of α-methacrylic acid per mol of melamine. 20 grams of the resulting reaction product were catalyzed as described in Example 1, and coatings were produced by pouring on to glass plates, which coatings were dust-dry after 2 hours 30 minutes and after 1 day had a Sward hardness of 27.8 and even after 2 days a Sward hardness of 40. The gelatinizing time of the product was 8 minutes. A test portion of the catalyzed reaction product kept in a test tube was completely hardened throughout after 4 days.

Example 3

208 parts of methylol-melamine allyl ether were reacted with 52 parts of crotonic acid under the conditions used in Example 1, but merely for 2 hours at 110–140° C. There were obtained 214 parts of a reaction product having a crotonic acid content of 10.8 percent, and an A.N. value of 15.0, an S.N. value of 86 and an E.N. value of 70.9.

When 20 grams of this reaction product are catalyzed with 6 percent of hydroxy-cyclohexyl hydroperoxide and with 0.1 percent of cobalt, a coating is obtained which become dust-dry after 8 hours 30 minutes. The mass gelatinizes after 1 hour 50 minutes. After 4 days a test sample kept in a test tube is completely hardened throughout even in the thickest layers.

Example 4

208 parts of methylol-melamine allyl ether were reacted with 26 parts of maleic acid monoallyl ester (prepared as described below) for 1½ hours at 70–83° C. and under the conditions described in Example 1. There were obtained 214 parts of the reaction product, having an A.N. value of 9.9, an S.N. value of 75.5 and an E.N. value of 65.6.

20 grams of this reaction product were catalyzed as described in Example 3, and a coating was produced by casting on a glass plate. After 8 hours 30 minutes the coating was dust-dry and after one day it had a Sward hardness of 27, after 2 days of 30 and after 3 days of 37. The mass gelatinizes already after 15 minutes, and it is completely hard throughout in the thickest layers after 4 days.

The maleic acid monoallyl ester was prepared by reacting 98 parts (1 mol) of maleic anhydride with 58 parts (1 mol) of commercial allyl alcohol at 110° C. for 16 hours, 13.5 parts (0.116 mol) of maleic acid crystallizing out upon cooling. The ester so obtained had an A.N. value of 306.7, the theoretical value being 359.

Example 5

208 parts of methylol-melamine allyl ether were reacted with 73.2 parts of glycol monoacrylic acid ester, obtained as described below, for 3 hours at 82–90° C. and under the conditions described in Example 1, whereby 259 parts of reaction product were obtained. It had an A.N. value of 10.8, an S.N. value of 122.8 and an E.N. value of 112.

20 grams of this reaction product were catalyzed with 4 percent of benzoyl peroxide dissolved in dioctyl phthalate in the form of a paste of 60 percent strength, and with 0.1 percent of cobalt in the form of its octoate dissolved in distilled styrene and stabilized with 0.05 percent of hydroquinone. The mixture was poured on to a glass plate and a coating was obtained which was dust-dry after 4 hours and after one day had a Sward hardness of 34.3, after 2 days of 47 and after 5 days of 50.2. The mass gelatinized in 2 hours 10 minutes.

The glycol monoacrylic acid ester was prepared by introducing 105 parts of ethylene oxide at about 98° C. for about 2 hours into a solution of 180 parts of acrylic acid, stabilized with 0.05 percent of hydroquinone, and to which 2.2 parts of potassium carbonate had been added at the beginning of the reaction. The product had an A.N. value of 66.1, an S.N. value of 433.5 and an E.N. value of 367.4. The theoretical values were A.N.=0, S.N.=483 and E.N.=483.

Example 6

208 parts of methylol-melamine allyl ether were reacted with 41.6 parts of acrylic acid amide, stabilized with 0.05 percent of hydroquinone, for 3¾ hours at 80–84° C. under the conditions described in Example 1, and 205.9 parts of reaction product were obtained having an acrylic acid amide content of 12.1 percent.

20 grams of the above reaction product were catalyzed as described in Example 5, and after pouring the composition on a glass plate a coating was produced which was dust-dry after one hour 55 minutes and after 1 day had a Sward hardness of 21.3, after 2 days of 29.4 and after 5 days of 35.2. The mass gelatinized in 2 hours 30 minutes and after 4 days was completely hardened throughout even in the thickest layers.

*Example 7*

208 parts of a methylol-melamine allyl ether containing 2 allyl groups were reacted with 15.6 parts of acrylic acid, stabilized with 0.05 percent of hydroquinone, for 2⅔ hours at 70° C. under the conditions described in Example 1. The final product consisted of 232 parts of a solution of 37.5 percent strength in toluene.

When catalyzed in a manner analogous to that described in Example 5 and poured on to a glass plate, the product produced a coating which was dust-dry after 25 minutes and after 1 day had a Sward hardness of 49.4, after 2 days of 59.2 and after 3 days of 62.1.

*Example 8*

208 parts of methylol-benzoguanamine allyl ether were reacted with 72 parts of acrylic acid, stabilized with 0.05 percent of hydroquinone, for 1¾ hours at 75° C. under the conditions described in Example 1. There were obtained 200 parts of a reaction product having an A.N. value of 17.4, an S.N. value of 63.5 and an E.N. value of 46.1.

When catalyzed in a manner analogous to that described in Example 5, and poured on to a glass plate, the product produced a coating which was dust-dry after 40 minutes and after 1 day had a Sward hardness of 30.7, after 2 days of 43.4 and after 3 days of 49.1.

What we claim is:

1. A composition capable of hardening throughout at room temperature at the surface and in the interior which comprises (1) a metal drier, (2) an organic peroxide, and (3) a condensation product obtained by condensing (A) a formaldehyde condensation product of an aminotriazine containing 2–3 $NH_2$-groups and in which formaldehyde condensation product 2–6 N-methylol groups are etherified with allyl alcohol with (B) an $\alpha:\beta$-unsaturated aliphatic compound selected from the group consisting of $\alpha:\beta$-unsaturated aliphatic monocarboxylic acids, $\alpha:\beta$-unsaturated aliphatic monocarboxylic acid amides, monoesters of $\alpha:\beta$-unsaturated aliphatic monocarboxylic acids with dihydric aliphatic alcohols, and monoesters of $\alpha:\beta$-unsaturated aliphatic dicarboxylic acids with monohydric aliphatic alcohols, said $\alpha:\beta$-unsaturated aliphatic compound containing only one free condensable group selected from the class consisting of carboxylic group, carboxamido group and hydroxyl group.

2. A composition capable of hardening throughout at room temperature at the surface and in the interior, which comprises (1) a cobalt drier, (2) an organic peroxide, and (3) a condensation product obtained by condensing (A) a formaldehyde condensation product of an aminotriazine containing 2–3 $NH_2$-groups and in which formaldehyde condensation product 2–6 N-methylol groups are etherified with allyl alcohol, with (B) an $\alpha:\beta$-unsaturated aliphatic compound selected from the group consisting of $\alpha:\beta$-unsaturated aliphatic monocarboxylic acids, $\alpha:\beta$-unsaturated aliphatic monocarboxylic acid amides, monoesters of $\alpha:\beta$-unsaturated aliphatic monocarboxylic acids with dihydric aliphatic alcohols, and monoesters of $\alpha:\beta$-unsaturated aliphatic dicarboxylic acids with monohydric aliphatic alcohols, said $\alpha:\beta$-unsaturated aliphatic compound containing only one free condensable group selected from the class consisting of carboxylic group, carboxamido group and hydroxyl group.

3. A composition capable of hardening throughout at room temperature at the surface and in the interior, which comprises (1) a metal drier, (2) an organic peroxide, and (3) a condensation product obtained by condensing (A) a formaldehyde condensation product of an aminotriazine containing 2–3 $NH_2$-groups and in which formaldehyde condensation product 2–6 N-methylol groups are etherified with allyl alcohol, with (B) an $\alpha:\beta$-unsaturated aliphatic monocarboxylic acid in which the carboxylic group is the only free condensable group.

4. A composition capable of hardening throughout at room temperature at the surface and in the interior, which comprises (1) a metal drier, (2) an organic peroxide, and (3) a condensation product obtained by condensing (A) a formaldehyde condensation product of an aminotriazine containing 2–3 $NH_2$-groups and in which formaldehyde condensation product 2–6 N-methylol groups are etherified with allyl alcohol, with (B) acrylic acid.

5. A composition capable of hardening throughout at room temperature at the surface and in the interior, which comprises (1) a metal drier, (2) an organic peroxide, and (3) a condensation product obtained by condensing (A) a formaldehyde condensation product of an aminotriazine containing 2–3 $NH_2$-groups and in which formaldehyde condensation product 2–6 N-methylol groups are etherified with allyl alcohol, with (B) maleic acid monoallyl ester.

6. A composition capable of hardening throughout at room temperature at the surface and in the interior, which comprises (1) a metal drier, (2) an organic peroxide, and (3) a condensation product obtained by condensing (A) a formaldehyde condensation product of an aminotriazine containing 2–3 $NH_2$-groups and in which formaldehyde condensation product 2–6 N-methylol groups are etherified with allyl alcohol, with (B) a monoester of an $\alpha:\beta$-unsaturated aliphatic monocarboxylic acid with a dihydric aliphatic alcohol in which monoester the hydroxyl group is the only free condensable group.

7. A composition capable of hardening throughout at room temperature at the surface and in the interior which comprises (1) a cobalt drier, (2) an organic peroxide, and (3) a condensation product obtained by condensing (A) a formaldehyde condensation product of an aminotriazine containing 2–3 $NH_2$-groups and in which formaldehyde condensation product 2–6 N-methylol groups are etherified with allyl alcohol, with (B) glycol monoacrylic acid ester.

8. A composition capable of hardening throughout at room temperature at the surface and in the interior, which comprises (1) a metal drier, (2) an organic peroxide, and (3) a condensation product obtained by condensing (A) a formaldehyde condensation product of an aminotriazine containing 2–3 $NH_2$-groups and in which formaldehyde condensation product 2–6 N-methylol groups are etherified with allyl alcohol, with (B) an $\alpha:\beta$-unsaturated aliphatic monocarboxylic acid amide in which the carboxamide group is the only free condensable group.

9. A composition capable of hardening throughout at room temperature at the surface and in the interior, which comprises (1) a metal drier, (2) an organic peroxide, and (3) a condensation product obtained by condensing (A) a formaldehyde condensation product of an aminotriazine containing 2–3 $NH_2$-groups and in which formaldehyde condensation product 2–6 N-methylol groups are etherified with allyl alcohol, with (B) a monoester of a $\alpha:\beta$-unsaturated aliphatic dicarboxylic acid with a monohydric aliphatic alcohol in which the carboxylic group is the only free condensable group.

10. A composition of matter capable of hardening throughout at room temperature at the surface and in the interior which comprises (1) a metal drier, (2) an organic peroxide, (3) styrene, and (4) a condensation product obtained by condensing (A) a formaldehyde condensation product of an aminotriazine containing 2–3 $NH_2$-groups and in which formaldehyde condensation product 2–6 N-methylol groups are etherified with allyl alcohol with (B) an $\alpha:\beta$-unsaturated aliphatic compound selected from the group consisting of $\alpha:\beta$-unsaturated aliphatic monocarboxylic acids, α:β-unsaturated aliphatic monocarboxylic acid amides, monoesters of α:β-unsaturated aliphatic monocarboxylic acids with dihydric aliphatic alcohols, and monoesters of α:β-unsaturated aliphatic dicarboxylic acids with monohydric aliphatic alcohols, said α:β-unsaturated aliphatic compound containing only one free condensable group selected from the class consisting of carboxylic group, carboxamido group and hydroxyl group.

References Cited in the file of this patent
UNITED STATES PATENTS 2,541,142   Zief et al. -------------- Feb. 13, 1951
2,764,574   Widmer ---------------- Sept. 25, 1956